Nov. 15, 1966  J. E. STORER, JR., ET AL  3,285,009

TRANSMISSION

Filed June 1, 1965

INVENTORS
John E. Storer, Jr.
BY Harry Fackenthal &
Ronald J. Deal
A. M. Heiter
ATTORNEY United States Patent Office 3,285,009
Patented Nov. 15, 1966

3,285,009
TRANSMISSION
John E. Storer, Jr., Harry Fackenthal, and Ronald J. Deal, Indianapolis, Ind., assignors to General Motors Corporation, Detroit, Mich., a corporation of Delaware
Filed June 1, 1965, Ser. No. 460,225
10 Claims. (Cl. 60—54)

This invention relates to transmissions and a method of assembly thereof, and particularly to a torque converter transmission arrangement and the method for assembling a torque converter transmission.

This invention provides a locking ring for locking an annular transmission member to a sleeve shaft to limit relative axial movement where access is only possible through the interior of the sleeve shaft. The locking ring fits in matching grooves in the interior surface of the annular member and the exterior surface of the sleeve shaft and has bent radial tangs at each end of the locking ring extending through a slot in the sleeve shaft so they are accessible from the interior of the sleeve shaft. A tool is employed to move the locking ring ends together to compress the locking ring and withdraw it from the groove in the annular member fully into the groove in the sleeve shaft for disassembly.

This arrangement is particularly suitable for attaching the inner race of the stator of a unitary torque converter assembly to a grounded sleeve shaft. The unitized torque converter assembly blocks access to the external surface of the grounded sleeve shaft, so that conventional external snap rings cannot be placed on the sleeve shaft to locate the inner race of the stator. This locking ring is accessible from the inside of the sleeve shaft to permit disengagement from the inner stator race when the turbine output shaft is removed from the grounded sleeve shaft.

It is an object of this invention to provide an improved positive locking ring connecting between an annular member and a sleeve shaft, which is disengageable from the interior of the sleeve shaft.

Another object of this invention is to provide in a torque converter transmission having a unitized housing and a pump, turbine and stator assembly located in the housing, a positive locking arrangement for positively locking the inner stator race to the grounded sleeve shaft by means of a locking device controlled from the interior of the grounded sleeve shaft.

Another object of the invention is to provide a positive locking ring for connecting an annular member to a sleeve shaft consisting of a shallow groove in the internal surface of the annular member, a deep groove in the external surface of the sleeve shaft permitting full withdrawal of the locking ring into the deep groove, the locking ring having inwardly bent end portions extending through a slot in the sleeve shaft for access to contract the locking ring into the deep groove to disengage the locking ring.

Another object of the invention is to provide in a unitized torque converter assembly having a housing and a pump, turbine and stator located within the housing, a grounded sleeve shaft extending into the housing and supporting the stator, a locking device, consisting of a shallow groove in the internal surface of the inner race of the stator and a deep groove on the exterior surface of the grounded sleeve shaft, the locking ring being self-biasing to seat in the outer shallow groove and project into the inner deep groove and having end tangs extending inwardly through a slot in the grounded sleeve shaft and accessible to compress the ring so that it fits entirely within the deep groove to disengage the sleeve shaft and stator race.

These and other objects of the invention will be apparent from the following description and drawing of a preferred embodiment of the invention.

Figure 1:
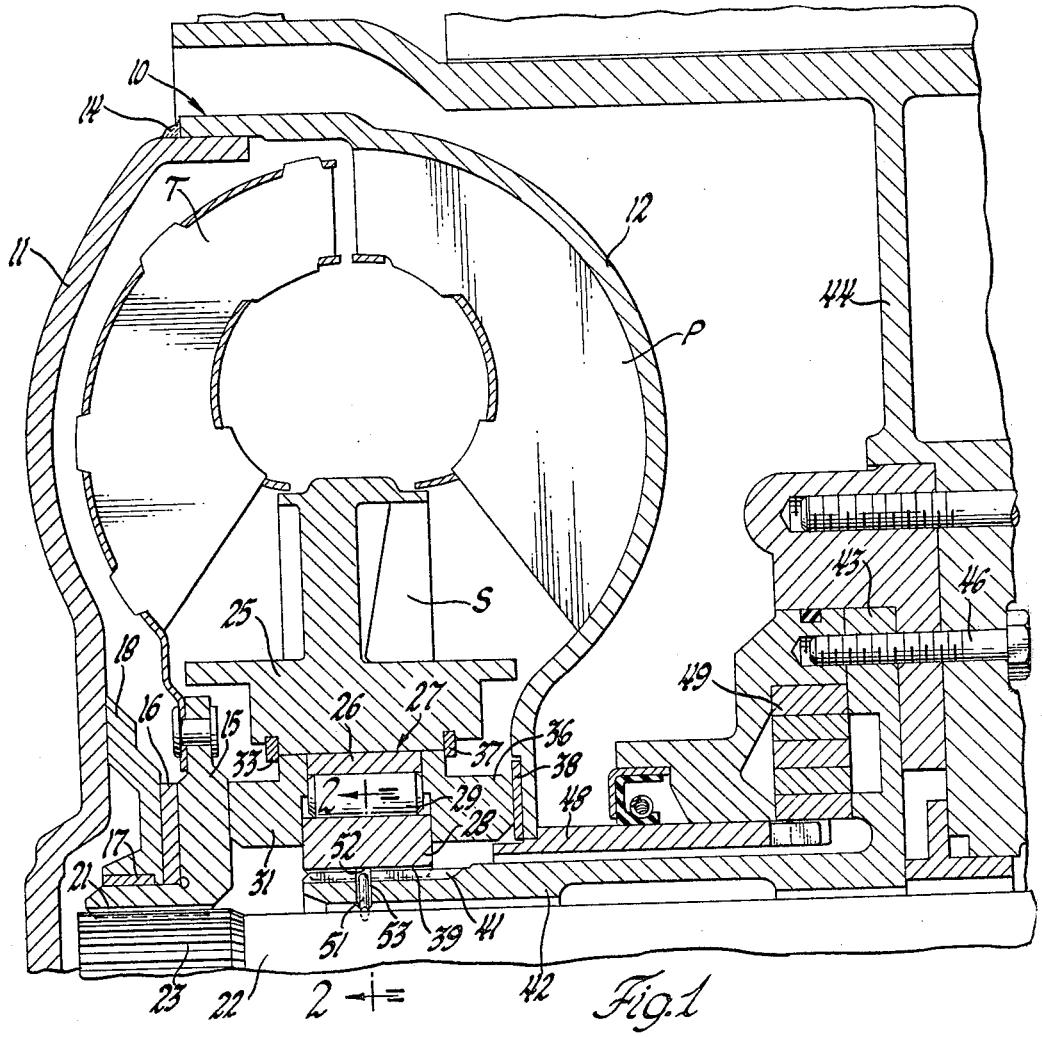
FIGURE 1 shows a partial sectional view of a torque converter assembly employing the invention.
Figure 2:
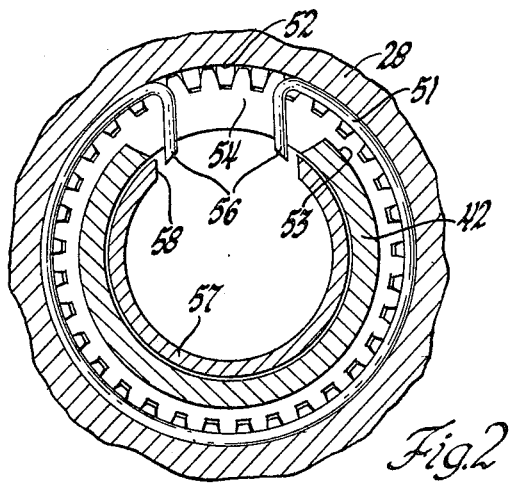
FIGURE 2 is a section of FIGURE 1 on the line 2—2 with shaft removed and tool inserted to remove ring.

The unitary torque converter housing 10 is suitably driven by an engine, not shown, and consists of a front part 11 and a rear part 12, permanently secured together as by welding 14. The pump blades P are secured to or integral with the housing part 12. The turbine blades T are attached to a hub 15, which is located by a thrust bearing 16, and a rotary bearing 17 with respect to the bearing part 18 attached to the front housing part 11. The hub 15 has internal splines 21 meshing with splines 23 on the output shaft 22 to provide a driving connection between the hub 15 and shaft 22 which permits axial withdrawal of the shaft 22 from the converter assembly. The stator blades S have a hub 25 which is mounted on the external race 26 of a one-way brake device 27. The annular internal race 28 has a smooth external surface engaging the rollers 29 which cooperate with conventional cam grooves in the external race 26. Conventional springs may be employed on the external race to bias the rollers to the engaged position. The side ring 31 is held on the stator hub 25 by a snap ring 33. The side ring 36 is similarly held in position by snap ring 37. The side rings 31 and 36 axially locate the one-way brake races and rollers and also axially locate the stator due to engagement of side ring 31 with turbine hub 15 and side ring 36 with thrust bearing 38 which engages the rear part 12 of the housing 11.

The in-race 28 has internal splines 39 meshing with splines 41 on grounded sleeve shaft 42. The sleeve shaft is integral with or fixed to a flange 43 secured to the fixed transmission housing 44 by bolts 46.

The input driven housing 10 drives pump sleeve shaft 48 which drives pump 49 to supply fluid to the torque converter, controls and lubrication system.

In order to positively secure the unitary torque converter assembly consisting of the housing 10, the pump, turbine, stator and one-way brake device 27 to the grounded sleeve shaft 42, a positive locking ring 51 is employed. The locking ring 51 is self-biasing to fit in a shallow groove 52 in the internal splines 39 of the inner race 28 and has a portion extending into the deep groove 53 in the external splines 41 and the grounded sleeve shaft 42 to lock the parts together. At the base of the deep groove 53 there is a slot 54 extending through the grounded sleeve shaft 42. The deep groove 53 extends from the outer diameter of shaft 42, the addendum diameter of splines 41, and beyond the inner diameter of annular race 28, the addendum diameter of splines 39, or substantially the root diameter of splines 41 a distance at least equal to the radial thickness of locking ring 51. The shallow groove 52 in annular race 28 extends outwardly from the addendum diameter sufficiently to lock the ring which in the case of a round ring 51 would be more than half its radial thickness. The radial thickness of the ring is about equal to the height of the splines so with the shallow groove as deep as the height of the splines, the center of the ring engages the flat side walls of the groove in each set of splines. The deep groove would then be twice the height of the splines so it can be contracted from the splines. The ends of the ring 51 have tangs 56 which extend through the slot 54 so that they do not contact output shaft 22 but after removal of the output shaft are accessible for engagement by a tool 57. The tool 57 is a sleeve tool which fits freely within the sleeve shaft 42 and has a recess 58 in the end thereof to receive both tangs 56. Preferably the sides of the recess in the tool are angled so that the outer edge first engages the tang and the tangs are similarly angled or diverge as they extend inwardly to assist in contracting the ring. The tool is rotated so that one side of the recess in the tool engages one tang and moves that tang, the ring and the other tang to engage an end of the slot 54 and then the one tang is moved toward the other tang by the tool to contract the ring 51 entirely within the deep groove 53 on the extrenal surface of the grounded sleeve shaft 42. This withdraws the locking ring 51 from the groove 52 in the inner race 28 of the one-way device 27. Then the unitary torque converter assembly may be withdrawn from the grounded sleeve shaft.

Thus to disassemble the transmission, the torque converter unit is disconnected from the transmission unit 44 by removng the fastening 46. This removes the turbine output shaft 22 or it may be separately removed so that the tool 57 may be inserted in the grounded sleeve shaft 42 to compress the locking ring 51 to remove the unitary stator assembly from the ground sleeve. The assembly is accomplished in a similar manner.

The recess on the end of the tool 57 may be wedge shaped with converging surfaces 58. Thus, additional inward movement of the tool subsequent to the engagement of the surfaces 58 with the tangs 56 will compress the locking ring 51.

The lock ring is placed on the sleeve shaft with the tangs projecting into the hollow center. Then the tool is inserted in the grounded sleeve shaft and the ring contracted. Then the torque converter assembly is placed on the sleeve shaft and the ring released so the locking ring enters both grooves to lock the parts together. After removal of the tool the turbine output shaft is inserted and grounded sleeve shaft fixed to a stationary housing.

It will be appreciated that this invention may be modified within the scope of the appended claims.

What is claimed is:

1. In apparatus of the character described, a sleeve shaft, an annular member mounted on said sleeve shaft, a locking ring, a shallow groove in the internal surface of said annular member having a depth from the outer diameter of the sleeve shaft less than the radial thickness of the locking ring, a deep groove in the outer surface of the sleeve shaft having a depth from the inner diameter of the annular member at least as large as the radial thickness of said locking ring, a slot extending from the base of said deep groove through said sleeve shaft, said locking ring having spaced ends having inwardly bent tang portions extending through said slot to the interior of said sleeve shaft.

2. In apparatus of the character described, a sleeve shaft having splines, an annular member having splines splined on said sleeve shaft, a locking ring, a shallow groove in the internal surface of said annular member having a depth from the outer diameter of the sleeve shaft less than the radial thickness of the locking ring, a deep groove in the outer surface of the sleeve shaft having a depth from the inner diameter of the annular member at least as large as the radial thickness of said locking ring, a slot extending from the base of said deep groove through said sleeve shaft, said locking ring having spaced ends having inwardly bent tang portions extending through said slot to the interior of said sleeve shaft.

3. In apparatus of the character described, a sleeve shaft having splines, an annular member having internal splines mounted on said sleeve shaft with the splines in mesh, a locking ring having a radial thickness substantially equal to the height of said splines, a shallow groove in the internal surface of said annular member having a depth from the inner diameter of the annular member substantially equal to the height of said splines, a deep groove in the outer surface of the sleeve shaft having a depth from the inner diameter of the annular member at least as large as the radial thickness of said locking ring, a slot extending from the base of said deep groove through said sleeve shaft, said locking ring having spaced ends having inwardly bent tang portions extending through said slot to the interior of said sleeve shaft.

4. In a transmission; a unitary torque converter assembly consisting of a housing having located therein a pump, a turbine and a stator having an annular member; a grounded sleeve shaft splined to said inner annular member to prevent relative rotation; a locking ring for axially positioning said annular member on said grounded sleeve shaft; a shallow groove in the internal surface of said annular member; a deep groove in the external surface of said grounded sleeve shaft having a depth from the inner diameter of the annular member at least as large as the radial thickness of said locking ring; said shallow groove having a depth from the inner diameter to hold a portion of said locking ring in said deep groove; a slot extending from the base of said deep groove through said sleeve shaft; said locking ring being normally biased into engagement with said shallow groove and having a portion in both said grooves to lock said member and shaft together; said locking ring having end portions extending through said slot accessible for engagement to move them together to contract said locking ring into said deep groove to permit axial disassembly of said unitary torque converter assembly from said grounded sleeve shaft.

5. In a transmission; a unitary torque converter assembly consisting of a permanently assembled housing having located and axially fixed therein a pump, a turbine and a stator having an annular internally splined member; a grounded sleeve shaft splined to said inner annular member to prevent relative rotation; a locking ring having a radial thickness substantially equal to the height of said splines for axially positioning said annular member on said grounded sleeve shaft; a shallow groove in the internal surface of said annular member having a depth from the inner diameter substantially equal to the radial thickness of said locking ring; a deep groove in the external surface of said grounded sleeve shaft having a depth from the inner diameter of the annular member at least as large as the radial thickness of said locking ring; a slot extending from the base of said deep groove through said sleeve shaft; said locking ring being normally biased into engagement with said shallow groove and having a portion in both said grooves to lock said member and shaft together; said locking ring having spaced end portions extending radially inward through said slot and accessible for engagement to move them together to contract said locking ring into said deep groove to permit axial disassembly of said unitary torque converter assembly from said grounded sleeve shaft.

6. The invention defined in claim 5 and said turbine having a smaller splined inner diameter than said annular member, a turbine shaft extending through said grounded sleeve shaft clearing said end portions of said locking ring and being splined to said splined inner diameter of said turbine.

7. In a transmission; a unitary torque converter assembly consisting of a housing having located therein a pump, a turbine and a stator having an annular member; a grounded sleeve shaft splined to said inner annular member to prevent relative rotation; a locking ring for axially positioning said annular member on said grounded sleeve shaft; a shallow groove in the internal surface of said annular member having a depth from the inner diameter substantially equal to the radial thickness of said locking ring; a deep groove in the external surface of said grounded sleeve shaft having a depth from the inner diameter of the annular member at least as large as the radial thickness of said locking ring; a slot extending from the base of said deep groove through said sleeve shaft; said locking ring being normally biased into engagement with said shallow groove and having a portion in both said grooves to lock said member and shaft together; said locking ring having spaced end portions extending through said slot accessible for engagement to move them together to contract said locking ring into said deep groove to permit axial disassembly of said unitary torque converter assembly from said grounded sleeve shaft.

8. A method of assembly for a transmission, the steps of mounting and contracting a snap ring within a groove on a grounded sleeve shaft, sliding a permanently unitized torque converter assembly over said grounded sleeve shaft, releasing the snap ring to engage a mating groove in a stator hub within the torque converter assembly and placing a turbine shaft in the grounded sleeve shaft with splines in mesh with a turbine hub.

9. A method of assembly for a transmission, the steps of mounting a grounded sleeve shaft on a stationary transmission housing, mounting and contracting a snap ring within a groove on said grounded sleeve shaft, sliding a permanently unitized torque converted assembly over said grounded sleeve shaft, releasing the snap ring to engage a mating groove in a stator hub within the torque converter assembly and placing a turbine shaft in the grounded sleeve shaft with splines in mesh with a turbine hub.

10. A method of assembly for a transmission, the steps of mounting a grounded sleeve shaft on a stationary transmission housing, mounting a snap ring in a groove on the sleeve shaft with tangs extending within the sleeve shaft, contracting the snap ring within a groove on said grounded sleeve shaft by gripping the snap ring from within the sleeve shaft with a tool, sliding a permanently unitized torque converter assembly over said grounded sleeve shaft, releasing the snap ring to engage a mating groove in a stator hub within the torque converter assembly, withdrawing the tool and placing a turbine shaft in the grounded sleeve shaft with splines in mesh with a turbine hub.

References Cited by the Examiner

UNITED STATES PATENTS

| 2,421,360 | 5/1947 | Swennes | 60—54 X |
| 2,844,013 | 7/1958 | Spence | 64—21 |
| 2,987,897 | 6/1961 | Spence | 64—21 |

EDGAR W. GEOGHEGAN, *Primary Examiner.*